United States Patent [19]
Watzenberger et al.

[11] Patent Number: 6,153,799
[45] Date of Patent: Nov. 28, 2000

[54] METHOD FOR PRODUCING HIGHLY PURE AQUEOUS HYDROXYLAMINE SOLUTIONS

[75] Inventors: Otto Watzenberger, Mannheim; Heiner Schelling, Kirchheim; Peter Pfab, Limburgerhof; Eckhard Ströfer, Mannheim, all of Germany

[73] Assignee: BASF Aktiengesellschaft, Ludwigshafen, Germany

[21] Appl. No.: 09/445,186

[22] PCT Filed: Jun. 18, 1998

[86] PCT No.: PCT/EP98/03714

§ 371 Date: Dec. 8, 1999

§ 102(e) Date: Dec. 8, 1999

[87] PCT Pub. No.: WO98/57886

PCT Pub. Date: Dec. 23, 1998

[30] Foreign Application Priority Data

Jun. 18, 1997 [DE] Germany .......................... 197 25 851

[51] Int. Cl.[7] ............................................. C01B 21/14
[52] U.S. Cl. ............................................. 564/497; 203/87
[58] Field of Search ................................ 564/497; 203/87

[56] References Cited

U.S. PATENT DOCUMENTS 3,351,426 11/1967 Leaver et al. .
4,147,623 4/1979 Koff et al. .
4,645,579 2/1987 Weiss et al. .
4,778,669 10/1988 Fuchs et al. .
4,956,168 9/1990 Wagaman .
5,472,679 12/1995 Levinthal et al. .
5,510,097 4/1996 Cawlfield et al. .
5,837,107 11/1998 Watzenberger et al. .

FOREIGN PATENT DOCUMENTS 001787 5/1979 European Pat. Off. .
108294 5/1984 European Pat. Off. .
237052 9/1987 European Pat. Off. .
3528463 2/1987 Germany .
97/22550 6/1997 WIPO .
97/22551 6/1997 WIPO .

OTHER PUBLICATIONS

Z. Anorg. Chem., 288, 1956, 28–35.
Roth–Weller: Gef. Chem. Reak., Stoffinformmation Hydroxylamin, p. 3, 1984.

Primary Examiner—Johann Richter
Assistant Examiner—Brian J. Davis
Attorney, Agent, or Firm—Keil & Weinkauf

[57] ABSTRACT

A very pure aqueous solution of free hydroxylamine is prepared by a process in which the dilute, aqueous hydroxylamine solution is concentrated in a column by removing hydroxylamine-containing vapors via a side take-off in the bottom of the column, and very pure hydroxylamine is obtained by condensing the vapors. The novel process can be carried out simply, in a gentle manner and on a large scale and gives electronic grade hydroxylamine.

6 Claims, 1 Drawing Sheet

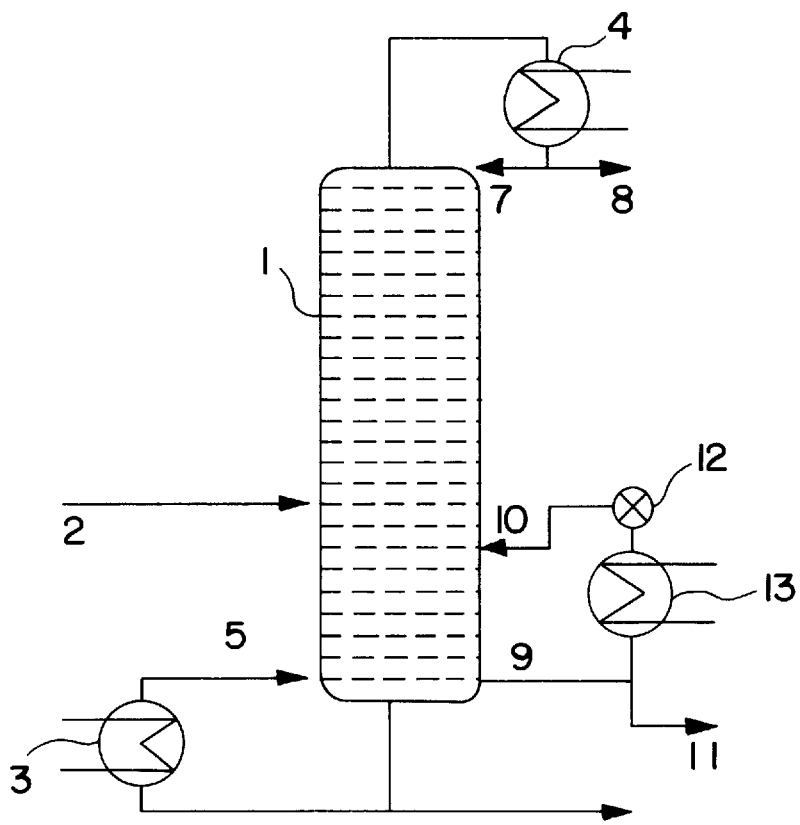
FIG. 1
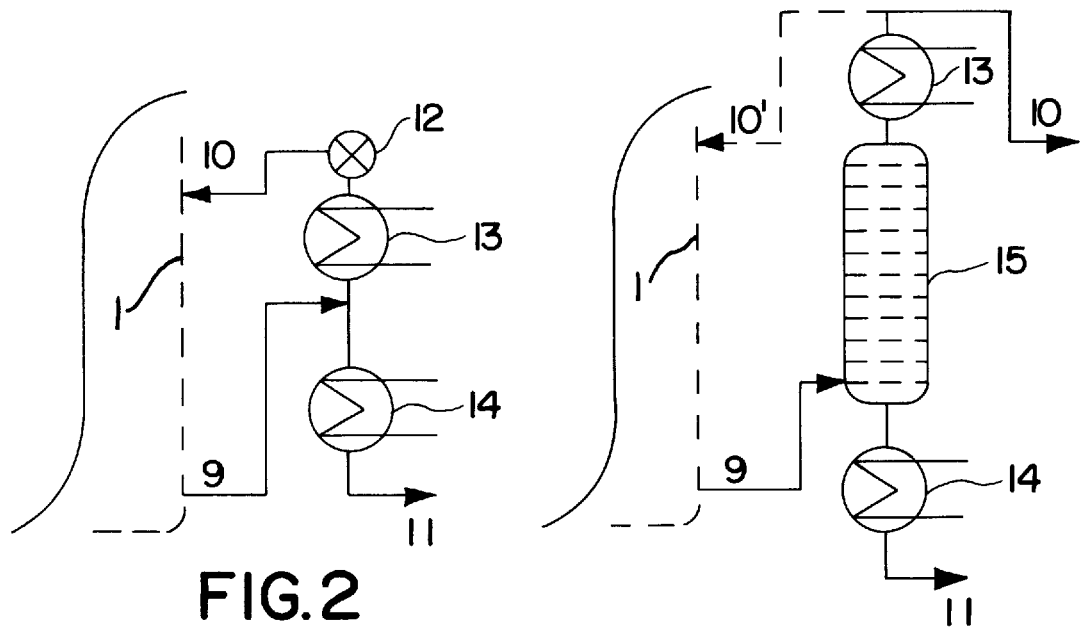
FIG. 2
FIG. 3

METHOD FOR PRODUCING HIGHLY PURE AQUEOUS HYDROXYLAMINE SOLUTIONS

This application is a 371 of PCT/EP98/03714 filed Jun. 18, 1998.

BACKGROUND OF THE INVENTION

1. Field of the Invention

The present invention relates to a process for the preparation of very pure, aqueous solutions of free hydroxylamine.

2. Description of the Related Art

Very pure, concentrated, aqueous hydroxylamine solutions are used, inter alia, in the electronics industry, for example in combination with other substances for preliminary cleaning of the circuit boards. For use in the electronics industry, concentrations of the impurities, in particular metal ions, well below 1 ppm, ie. electronic grade products, are usually required. However, the aqueous hydroxylamine solutions commercially available at present contain impurities in the ppm range from the preparation, for example sodium sulfate or other metal compounds.

Hydroxylamine is produced on a large industrial scale as hydroxylammonium salt, usually as hydroxylammonium sulfate. Frequently, however, it is necessary to use a highly concentrated salt-free aqueous solution of free hydroxylamine. In order to avoid the abovementioned problems and in particular the instability of the hydroxylamine, those skilled in the art have avoided the use of traditional methods of large-scale chemistry for concentrating distillable substances, for example distillation, in the recovery of salt-free hydroxylamine solutions. The distillation of hydroxylamine, even on the laboratory scale, is even said to be a particularly dangerous operation; cf. Roth-Weller: Gefahrliche Chemische Reaktionen, Stoffinformationen Hydroxylamin, page 3, 1984, 2, Ecomed-Verlag. The distillation of hydroxylamine on an industrial scale has therefore also never been considered in technical publications. Instead, special methods have been used, although all of them have serious disadvantages.

Attempts were thus made to isolate free hydroxylamine from aqueous salt solutions with the aid of ion exchangers; cf., for example, U.S. Pst. No. 4,147,623, EP-A-1787, EP-A-237 052 and Z. Anorg. Ch. 288, 28–35 (1956). However, such a process leads only to dilute solutions with low space-time yields. Moreover, hydroxylamine reacts with many ion exchangers or is decomposed by them.

A further method comprises the electrodialysis of an aqueous hydroxylammonium salt solution in electrolysis cells with semipermeable membranes, as described, for example, in DE-A-33 47 259, JP-A-123 771 and JP-A-123 772. However, such a process is technically complicated and expensive and has to date not become established in industry.

DE-A-35 28 463 discloses the preparation of free hydroxylamine from hydroxylammonium sulfate by treatment with calcium oxide, strontium oxide or barium oxide and removal of the insoluble alkaline earth metal sulfates. In this method, the removal of the sulfates obtained in finely divided form presents considerable difficulties. In addition, only dilute solutions are obtained and, when calcium oxide or calcium hydroxide is used, free hydroxylamine still contains undesirably large amounts of ions owing to the relatively good solubility of the calcium sulfate. When strontium compounds and barium compounds are used, the relatively high price and especially the toxicity are moreover disadvantageous with regard to an industrial production process.

DE-A-12 47 282 describes a process in which alcoholic solutions of free hydroxylamine are obtained by reacting hydroxylammonium sulfate with ammonia in alcohol as a solvent and removing the ammonium sulfate. A similar process is described in EP-A-108 294. However, alcoholic solutions are unsuitable and undesirable for a number of applications. For example, particular precautions must be taken during the handling of such solutions, owing to their flammability. Furthermore, the alcohol used must as a rule be recovered by an expensive procedure, since the discharge of relatively large amounts of alcohol into waste water treatment plants or into outfalls is prohibited.

Finally, DE-A-36 01 803 describes a process for obtaining aqueous solutions of free hydroxylamine, in which hydroxylammonium sulfate is reacted with ammonia in lower alcohols, the precipitated ammonium sulfate is separated off, water is added to the alcoholic solution of free hydroxylamine and the alcohol is distilled off from the solution thus obtained. The abovementioned disadvantages of working with alcohol are applicable to this process too. Moreover, owing to the instability of the hydroxylamine in conjunction with the flammability of the alcohols, particular caution is required in the final distillation stage.

Common to all prior art processes is that they are not suitable for being carried out on an industrial scale or give rise to uneconomically high additional safety costs.

For the decomposition of hydroxylamine, a temperature above 65° C. is regarded as critical. In a differential thermal analysis, the onset temperature of a 50% strength by weight aqueous hydroxylamine solution (in a glass crucible) was determined as 70° C. The amount of heat liberated, viz. about 2.2 kJ/g of 50% strength by weight solution, confirms the high thermal potential of the material. Differential thermal analysis is a microthermoanalytical method which is employed for screening to estimate the thermal stability and the thermal potential. The onset temperature is the lowest ambient temperature at which a noticeable exothermic reaction proceeds in the sample at a heating rate of 1 K/min, commencing at 30° C. For safety reasons, the processing temperature should be significantly below the onset temperature.

In the context of the preparation of hydroxylamine nitrate, U.S. Pat. No. 4,956,168 describes the preparation of a slurry of hydroxylamine sulfate in alcohol at a temperature which does not exceed 65° C. This slurry is then treated with ammonia at $\leq 65°$ C. to produce an alcoholic hydroxylamine solution.

U.S. Pat. No. 5,472,679 describes a process for preparing an alcohol-free, aqueous hydroxylamine solution by reacting a hydroxylamine sulfate solution with a suitable base at up to about 60° C. The mixture obtained is then subjected to distillation under reduced pressure at below 65° C. This gives a solid residue (the salt formed in the liberation of the hydroxylamine) and as distillate an aqueous hydroxylamine solution containing 16–23% by weight of hydroxylamine. This process has the disadvantage that it requires working under reduced pressure and the temperature has to be controlled carefully.

In addition, the process requires working with solids. In a continuous process, the solid would accordingly have to be removed continuously. This can present great problems in terms of process technology if the solid is one which tends to cake, eg. in the case of $Na_2SO_4xH_2O$.

Furthermore, the "distillation" proceeds to dryness, more correctly described as evaporation, such that the low-boiling water evaporates first. The high-boiling hydroxylamine accumulates. It is known that the decomposition tendency of hydroxylamine increases with the concentration of hydroxylamine, and together with it the losses of hydroxylamine during the process. There is an increasing risk that, because of the high concentration of hydroxylamine, explosive decomposition will occur. It is known that pure hydroxylamine or hydroxylamine>70% by weight decomposes explosively. Thus, appropriate safety requirements must be fulfilled for the process mentioned.

Finally, the remaining solid still contains residues of hydroxylamine (hydroxylamine adsorbed on the surface, hydroxylamine in interstitial spaces in the solid). The solid therefore has to be decontaminated in a separate disposal process.

DE 1954775.8 describes a process for the preparation of aqueous solutions of free hydroxylamine, the solution obtained by treating a hydroxyl ammonium salt with a base being separated into an aqueous hydroxylamine fraction and a salt fraction by treatment with water or steam at >80° C. Any desired concentration of the aqueous hydroxylamine solution obtained is carried out by distillation, by evaporating off water in a column. In addition to the hydroxylamine, the sparingly volatile impurities may also accumulate in the bottom. This problem which is a general one in the case of bottom products is solved in industry, for example, by a further distillation. In the case of hydroxylamine, however, this is problematic since concentration of hydroxylamine to over 50% by weight is unavoidable in a further distillation of the, for example, 50% strength solution. However, the tendency of the hydroxylamine to undergo decomposition also greatly increases. The distillation must therefore be carried out at low temperatures and pressures at a corresponding cost and with a corresponding time requirement, and can usually also be effected only on a small scale. Accordingly, salt-free, aqueous hydroxylamine solutions of electronic grade purity are complicated to prepare and therefore relatively expensive and, for economic reasons, their use is restricted to a few areas.

It is an object of the present invention to provide a simple process for the preparation of very pure hydroxylamine containing <1 ppm of metal ions.

BRIEF SUMMARY OF THE INVENTION

We have found that the above object is achieved, if, starting from dilute hydroxylamine solution having a low salt content, concentrated, very pure hydroxylamine solution containing <1 ppm of metal ions is obtainable by removing the hydroxylamine-containing vapors via a side take-off in the bottom of the column.

The present invention therefore relates to a process for the preparation of an aqueous solution of very pure, free hydroxylamine by concentrating and purifying an aqueous hydroxylamine solution, wherein the concentration is carried out in a column, hydroxylamine-containing vapors are removed via a side take-off in the bottom of the column, and very pure hydroxylamine is obtained by condensing the vapors. The very pure hydroxylamine solution thus obtained contains more than 20, preferably more than 40, in particular more than 50,% by weight of hydroxylamine and <1 ppm, in particular <0.1 ppm of metal ions (in particular from the preparation or from the materials used for the preparation and isolation).

The aqueous hydroxylamine solution used as starting material for the novel process can be obtained in any manner known per se, for example by one of the processes stated at the outset. Particularly preferably, the dilute hydroxylamine solution is obtained by the process described in German Patent Application No. 1954775.8, a hydroxylammonium salt being treated with a suitable base in water in a first stage a) and, in a stage b), the solution obtained, if necessary after removal of insoluble components, being separated into an aqueous hydroxylamine fraction and a salt fraction by treatment with water or steam at >80° C.

The stage (a) of the process is carried out in a conventional manner. Hydroxylammonium salts generally used are the hydroxylammonium salts of mineral acids, for example of sulfuric acid, phosphoric acid or hydrochloric acid, usually in aqueous solution. The hydroxylammonium salt is reacted with a suitable inorganic base, for example ammonia, sodium hydroxide, potassium hydroxide, potassium hydroxide or calcium hydroxide, in aqueous solution. The amount of the base is chosen so that the hydroxylammonium salt is converted completely or at least partially into free hydroxylamine. This may be carried out continuously or batchwise and at from about 0° C. to 100° C. The aqueous solution obtained contains free hydroxylamine and the salt which originates from the base cation and the acid anion present in the hydroxylammonium salt.

Depending on the type and concentration of the hydroxylammonium salt, the base used for liberating the hydroxylamine and the temperature at which the reaction is carried out, some of the salt formed may be precipitated. If necessary, the solution may also be cooled in order to precipitate a larger amount of the salt. If such insoluble components, ie. salt precipitates, are present, they are advantageously separated off in a conventional manner before stage (b). Depending on the process conditions, for example with the use of ammonia as the base or the use of sodium hydroxide as the base and relatively low concentration of the reactants, no precipitate is formed.

Separation in stage (b) of the solution obtained from stage (a) into an aqueous hydroxylamine fraction and a salt fraction is preferably carried out by treatment with water or steam in a stripping column. The stripping column generally used is a conventional plate column, eg. bubble tray column or sieve plate column, or a column having a conventional packing, for example Raschig rings, Pall rings, saddle elements, etc. It preferably has from 5 to 70 theoretical plates. The stabilized solution, to which further stabilizer may, if required, be added, is fed directly to the top of the column (upper part of the packing or uppermost plate).

In the stripping column, the solution is separated in such a way that the salt fraction is taken off at the bottom of the column and an aqueous hydroxylamine fraction is taken off at the height of the feed plate or above it, in particular via the top. In order to achieve this, it is preferable to treat the solution by passing water and/or steam countercurrent into the bottom of the column. At a hydroxylamine concentration of from 5 to 45% by weight in the feed solution, the flow rate of water or steam is generally from 1 to 8, in particular from 1 to 5, times the feed rate.

The temperature of the water or steam introduced is generally from 80 to 180° C. If required, the bottom of the column is additionally heated. The temperatures prevailing at the top of the stripping column depend on the pressure at which the column is operated. This pressure is in general from 5 to 300 kPa (from 0.05 to 3 bar), preferably from 50 to 300 kPa (0.5 to 3 bar), particularly preferably from 50 to 150 kPa (from 0.5 to 1.5 bar). The temperatures at the top of the stripping column are accordingly in general from 80 to 130° C., preferably from 90 to 120° C. The temperature of the steam passed in may be substantially higher, for example also 150° C. Advantageously, however, it should not be so high that too much water also evaporates from the salt solution and the salt begins to precipitate in the bottom of the column.

If desired, a droplet precipitator (demister) is additionally installed above the feed plate or in the vapor take-off in such a way that entrainment of the salt by droplets is prevented.

In the novel process, the aqueous hydroxylamine fraction which is taken off via the top of the stripping column and usually contains from 10 to 200 g of hydroxylamine/liter is brought to the desired final concentration of about 50% by weight. A conventional packed column containing the abovementioned packings or a suitable plate column is advantageously used for this purpose. A column having from 4 to 30 theoretical plates is preferred. A falling-film evaporator is advantageously used for heating the bottom of the column but it is of course also possible to use other conventional bottom heaters, such as natural or forced circulation evaporators, plate heat exchangers, etc.

In general, the concentration column is operated at from 1 to 200 kPa (from 0.01 to 2 bar), preferably from 5 to 120 kPa (from 0.05 to 1.2 bar), and particularly preferably from 30 to 110 kPa (from 0.1 to 1.1 bar).

The dilute hydroxylamine solution is fed at a suitable point, for example at the height of plates 1 to 10, to the concentration column. At the same time, further stabilizer may be fed to the top of the column for further stabilization of the hydroxylamine solution. The water distilled off from the hydroxylamine solution is taken off at the top of the column and typically contains less than 0.06% of hydroxylamine. The side take-off via which the hydroxylamine-containing vapors are taken off to obtain the highly concentrated, very pure hydroxylamine solution is preferably located below the first plate, but in such a way that no droplets are entrained. This is effected, for example, by installing a demister. A hydroxylamine solution more highly contaminated with salt is obtained at the bottom of the column. Its purity depends on the respective amounts which are removed via the side take-off and the bottom take-off. The amount taken off via the side take-off for producing very pure, aqueous hydroxylamine solution is additionally limited by the minimum vapor flow in the column which is required for hydrodynamically stable operation. In an advantageous embodiment of the novel process, the vapors in the bottom of the column are removed from the outlet of the falling-film evaporator used for heating the bottom.

According to the invention, the hydroxylamine solution taken off from the bottom of the column via the side take-off is separated in a condenser into the concentrated, very pure, aqueous hydroxylamine solution containing <1 ppm of impurities and hydroxylamine-containing steam. The vapors leaving via the top of the condenser can be recycled to the column at a suitable point, for example at the height of plates 1 to 10, for recovering the hydroxylamine still present.

In a particularly advantageous embodiment of the novel process, an evaporator is installed below the feed of the vapors taken off via the side take-off into the condenser, in such a way that, by evaporating some of the water in the very pure, aqueous hydroxylamine solution, the concentration of the latter can be brought to the desired final concentration. The steam-rich vapors produced can in turn be recycled at the column to a suitable point for recovering the hydroxylamine still present.

In a further, very particularly preferred embodiment of the novel process, the vapors taken off from the bottom of the concentration column are passed into a side column having a bottom evaporator. This makes it possible further to reduce the hydroxylamine content of the vapor stream recycled to the concentration column and substantially to reduce the amount of vapor circulated between concentration column and electronic grade side unit. The use of the side column furthermore makes it possible to remove up to 99% of the hydroxylamine solution as electronic grade product from the bottom via the side take-off, while the remaining, roughly 1%, in this case highly contaminated hydroxylamine solution has to be removed via the bottom of the concentration column. However, this small amount can be recycled in order to recover the hydroxylamine in stage (b) of the process for separating off salt according to DE 1954775.8.

In order to achieve a particularly low metal ion concentration in the hydroxylamine, the parts of the side take-off plant may be produced from materials free of metal ions and resistant to hydroxylamine, for example of plastics, such as polypropylene or polytetrafluoroethylene (PTFE).

When a condenser/evaporator unit is used for obtaining the very pure hydroxylamine solution, up to 60% of the hydroxylamine solution can be taken off as 50% strength by weight electronic grade product at a ratio of the flow rate of the vapor take-off from the bottom to the flow rate of the condensate taken off from the bottom of the side take-off of 10:1, without the distillation behavior of the concentration column being influenced. The remaining 40% are obtained as 50% strength hydroxylamine solution with a standard salt content. When a side column is used, up to 99% of the concentrated hydroxylamine solution can be obtained as electronic grade product via the side take-off from the bottom at a ratio of the flow rate of the vapor take-off into the side column to the flow rate of electronic grade product produced of less than as 6:1.

The novel process can therefore simultaneously deliver varying amounts of standard and electronic grade product, so that rapid adaptation to the requirements of the market is possible. Furthermore, it is possible for the first time economically and reliably to prepare very pure, aqueous electronic grade hydroxylamine solution under continuous conditions on a large industrial scale. The continuous manual handling of the highly sensitizing hydroxylamine solutions, which is unavoidable in small-scale production, is avoided. The handling of more highly concentrated, ie. over 50% strength by weight hydroxylamine solutions is also dispensed with. This results in a high degree of operational safety inherent in the process.

Solutions which contain free hydroxylamine can be stabilized by adding a conventional stabilizer against decomposition.

BRIEF DESCRIPTION OF THE DRAWINGS

FIGS. 1 to 3 illustrate, by way of example, some embodiments of the novel process.

FIG. 1 shows a schematic diagram of a concentration plant for obtaining very pure hydroxylamine.

FIG. 2 shows a schematic diagram of a side take-off plant.

FIG. 3 shows a schematic diagram of a further embodiment of a side take-off plant.

FIG. 1 shows a concentration column 1. Dilute, aqueous hydroxylamine solution 2 is fed to about the middle of the column 1. Water is distilled off at the top of the column 1 and condensed in a condenser 4 and water is removed via the line 8 at a rate corresponding to the set reflux ratio and is recycled to the column via the line 7. Salt-containing hydroxylamine solution 6 is taken off from the bottom of the column and some of it is recycled via an evaporator 3 and line 5 to the bottom of the column. To obtain the very pure hydroxylamine solution, hydroxylamine-containing vapors 9 are removed via a side take-off located in the bottom of the column and are then condensed in a condenser 13. The very pure hydroxylamine solution 11 is removed below the condenser 13 and hydroxylamine-containing steam 10 is recycled to the column 1 via a flow governor 12.

FIG. 2 shows a preferred side take-off plant of the novel process. The vapors 9 removed via the side take-off in the bottom from the concentration column 1 (merely indicated ) are introduced into the side plant below a condenser 13 and above an evaporator 14. The hydroxylamine concentration of the very pure hydroxylamine solution 11 can be varied by partial evaporation, in the evaporator 14, of the hydroxylamine solution condensed in the condenser 13. The vapors 10 enriched in hydroxylamine can in turn be recycled to the concentration column 1 via a flow governor 12.

The particularly preferred embodiment shown in FIG. 3 comprises an additional column in the side take-off plant. The hydroxylamine-containing vapors 9 taken off from the bottom of the concentration column 1 (merely indicated) are passed into a side column 15 in the vicinity of the bottom. At the top of this column, hydroxylamine-containing water 10 is condensed by means of a condenser 13 and is recycled through line 10 to the concentration column 1. Very pure hydroxylamine solution 11 is obtained from the bottom of the side column 15 after passing through evaporator 14. In this particularly preferred embodiment of the invention, up to 99% of the hydroxylamine 2 fed to the concentration column 1 can be obtained as electronic grade product 11.

The examples which follow illustrate the invention with reference to FIG. 1, without restricting the invention.

EXAMPLE 1

1600 g/h of a 3.2% strength by weight aqueous, substantially salt-free, stabilized hydroxylamine solution 2 were fed into a glass bubble tray column 1 having a diameter of 50 mm and 30 bubble trays, at the eighth tray. The column was operated at 300 mbar. A small amount of stabilizer which was dissolved in hydroxylamine solution was additionally metered into the column 1 on the uppermost tray, No. 30. Water 8 was distilled off via the top of the column 1, the reflux ratio being 0.5. The distillate still contained a residual amount of 0.06% by weight of hydroxylamine. About 75 ml/h of a 50% strength by weight hydroxylamine solution 6 were discharged from the bottom of the column by means of a pump. The bottom discharge contained up to 45 ppm of sodium sulfate. A transfer section to a laterally arranged condenser 13 was furthermore mounted at the bottom of the column, below the first tray. As a result of the back-pressure of the column, caused by the pressure loss via the sieve plates, vapor was forced from the bottom of the concentration column 1 into the laterally mounted condenser 13. The flow rate of the vapor was limited by a hand valve 12 at the top outlet of the condenser 13. The vapor 10 leaving via the top of the condenser was passed to the eighth tray of the concentration column 1. About 18 ml/h of an about 20–35% strength by weight hydroxylamine solution 11 were condensed in the condenser 13 and transported to a separate receiver by means of a laboratory pump. Stabilizer was added continuously to this solution. The concentration of the metal ions was less than 0.1 ppm.

EXAMPLE 2

An about 10% strength by weight hydroxylamine solution was concentrated to 50% by weight in a glass bubble tray column of 5m height and 0.3 m diameter at about 77° C. and 0.3 bar. Vapor was removed from the bottom of the column via PTFE lines and passed into a laterally mounted 51 storage container with double-jacket cooling means. A part of the vapors was condensed therein. The uncondensed vapors were recycled to the fifth tray of the column via a PTFE vapor line. The amount of vapor was limited manually by means of a throttle valve. The condensed vapor in the cooled receiver was then concentrated to 50% by weight (very pure product).

The hydroxylamine solutions produced (50% by weight in each case) had the following composition (metal content in mg/kg; analytical accuracy: 0.1 mg/kg):

|  | Standard product (without side take-off) | Very pure product (with side take-off) |
|---|---|---|
| Boron | 3.0 | <0.1 |
| Sodium | 9.0 | <0.1 |
| Potassium | 0.3 | <0.1 |
| Calcium | 0.2 | <0.1 |
| Aluminum | 1.0 | <0.1 |
| Silicon | 24.0 | <0.1 |
| Iron | 0.1 | <0.1 |

All metal ion concentrations in the very pure product were below the limit of detection of 0.1 mg/kg. The required purity of <0.1 mg of metal/kg of solution was achieved with certainty.

In a further experiment, a hydroxylamine solution was prepared by concentration in the bubble tray column without side take-off (standard product).

We claim:

1. A process for the preparation of very pure, aqueous hydroxylamine solution by concentrating and purifying an aqueous hydroxylamine solution, wherein the concentration is carried out in a column, hydroxylamine-containing vapors are removed via a side take-off in the bottom of the column and very pure hydroxylamine is obtained by condensing the vapors.

2. A process as defined in claim 1, wherein the hydroxylamine solution intended for concentration and purification is obtained by a) treating a hydroxylammonium salt with a suitable base in water and, b) separating the solution obtained, if necessary after removal of insoluble components, into an aqueous hydroxylamine fraction and a salt fraction by treatment with water or steam at <80° C.

3. A process as defined in claim 1, wherein the condensation of the very pure hydroxylamine solution is effected by introducing the hydroxylamine-containing vapors, removed via the side take-off, below a condenser and above an evaporator and partially evaporating again in the evaporator the hydroxylamine solution condensed in the condenser, so that a more highly concentrated very pure hydroxylamine solution is obtained.

4. A process as defined in claim 1, wherein the hydroxylamine-containing vapors taken off via a side take-off in the bottom of the column are passed into a side column and very pure hydroxylamine solution is obtained at the bottom of the side column.

5. A process as defined in claim 1, wherein the side take-off is connected on the gas side to the concentration column.

6. A process as defined in claim 1, wherein materials free of metal ions and resistant to hydroxylamine are used for the parts of the side take-off plant.

* * * * *

UNITED STATES PATENT AND TRADEMARK OFFICE
CERTIFICATE OF CORRECTION

PATENT NO. : 6,153,799
DATED : November 28, 2000
INVENTOR(S) : Watzenberger et al.

Page 1 of 1

It is certified that error appears in the above-identified patent and that said Letters Patent is hereby corrected as shown below:

Column 7,
Line 45, "Sm" should be -- 5 m --.

Column 8,
Line 11, insert as the last line of the table:
--Totals metals          38               <0.1 --.

Signed and Sealed this

Twenty-third Day of October, 2001

Attest:

*Attesting Officer*

NICHOLAS P. GODICI
*Acting Director of the United States Patent and Trademark Office*